Patented Jan. 14, 1936

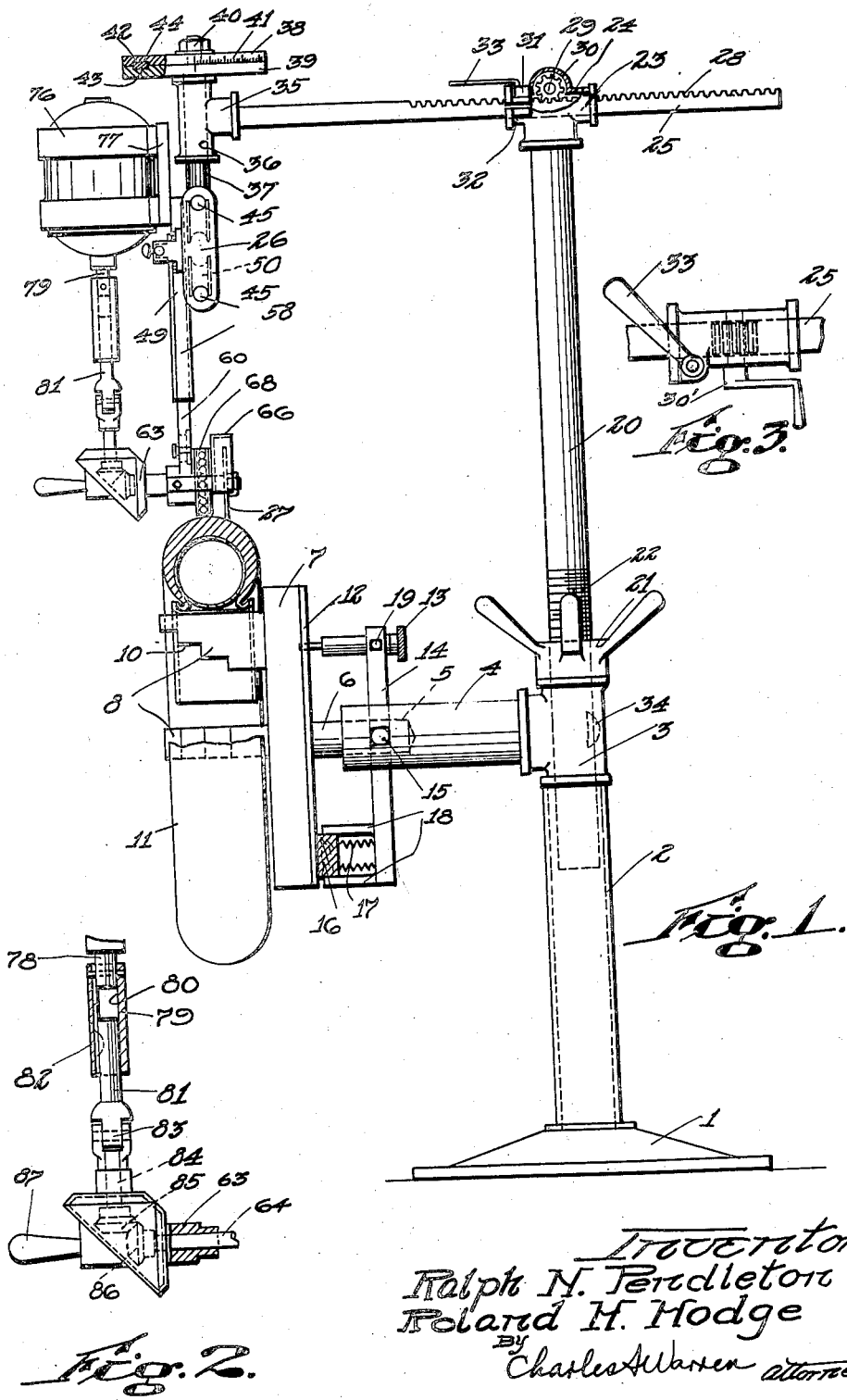

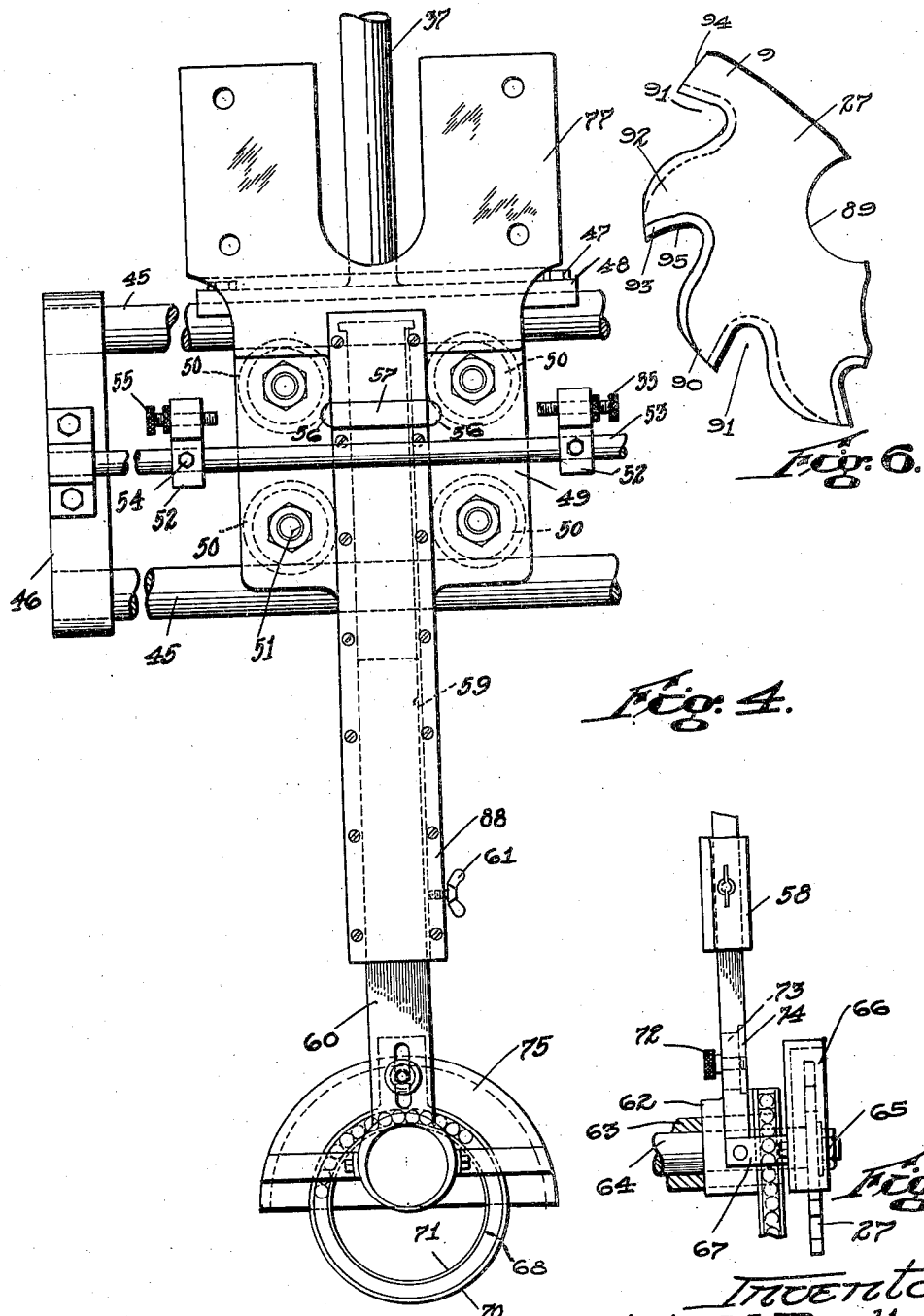

2,027,490

UNITED STATES PATENT OFFICE 2,027,490

TIRE GROOVING MACHINE

Ralph N. Pendleton and Roland H. Hodge, Worcester, Mass., assignors, by mesne assignments, to Victor M. Catok, New York, N. Y.

Application April 6, 1932, Serial No. 603,480

10 Claims. (Cl. 90—16)

The present invention relates to tire grooving devices and particularly to a device by which grooves may be cut in a worn automobile tire to reestablish a non-skid surface thereon.

The principal object of the present invention is to provide for forming grooves in the tread surface of a tire, said grooves having any desired configuration. In this manner, the tread grooves may be made deeper or, in case the entire non-skid tread is worn away, any suitable tread design may be incorporated thereon. The invention further involves a gage member which prevents the grooves from being cut too deep in the tire, and a novel cutter with which the grooving may be effected at a rapid rate without burning the tire. Other objects and advantages of the invention will appear from the following description in connection with the accompanying drawings in which:—

Fig. 1 is an elevation of a device embodying the invention.

Fig. 2 is an enlarged elevation of a portion of the device of Fig. 1.

Fig. 3 is a fragmentary plan view showing certain of the parts of the device.

Fig. 4 is an elevation of the carriage for the cutter, with the driving motor removed.

Fig. 5 is a fragmentary side elevation of the cutter mounting.

Fig. 6 is a fragmentary plan view of the cutter used.

Like reference characters refer to like parts in the different figures.

Referring to the drawings and particularly to Fig. 1, a base 1 has an upwardly extending support 2 to the upper end of which a coupling 3 in the form of a T is secured, said T carrying the mounting for the tire. A member 4 extends horizontally from the coupling 3 and has a horizontal recess 5 in its outer end for the reception of a shaft 6 on which a universal chuck 7 is suitably journaled. Said chuck has the usual plurality of radially movable jaws 8, and each of said jaws carries a section 10 of an automobile rim for engagement with the beads of a tire 11, said jaws and rim supporting said tire 11 for rotation about its axis. The back of the chuck 7 is provided with an index plate 12 with which a spring actuated plunger 13 is arranged to engage to permit indexing of said chuck through predetermined angles. The plunger is carried on a rod 14 extending through and adjustable in the member 4, said rod being held in adjusted position by a set screw 15. A brake member 16, for preventing undesired rotation of the chuck 7, is urged into engagement with the plate 12 by springs 17, said brake member 16 being slidable between parallel lugs 18 on the end of the rod 14 remote from the plunger 13. In cutting circumferential grooves, the plunger 13 is locked out of engagement with the plate 12 by a set screw 19.

The upwardly extending support 2 is hollow and receives the lower end of a vertical standard 20, the latter being raised or lowered by a pilot wheel 21 engaging the upper end of the coupling 3, said pilot wheel having a threaded bore which engages with the threaded lower end 22 of the standard 20. The upper end of the standard 20 is provided with a T-shaped coupling 23 having a horizontal bore 24 for the reception of a horizontal shaft 25 on the outer end of which the mechanism 26 for supporting a cutter 27 is mounted. The horizontal shaft 25 is provided with a rack 28, and a pinion 29 secured to a shaft 30 in the coupling 23 is in engagement with said rack. The shaft 30 carries on the forward end thereof a crank 30' by which said pinion is rotated for movement of the shaft 25 through said coupling 23 to provide for adjustment of the cutter 27 in a direction parallel to the axis of the tire. The shaft 25 is locked in adjusted position by a clamping bolt 31, turning movement of which operates to tighten the left hand split end 32 of the coupling 23 around said shaft 25, and the bolt 31 preferably carries a projecting arm 33 by which said bolt is tightened. The shaft 25 extends in substantially parallel relation to the axis of the chuck 7, as will be apparent from Fig. 1, said shaft 25 being held in desired angular relation to said chuck by a key 34, in the coupling 3, said key engaging a key-way, not shown, in the vertical standard 20.

As above stated, the cutter 27 and the supporting mechanism 26 is carried on the end of the shaft 25. As shown, a member 35 on the end of the shaft 25 has a vertical bore 36 for the reception of a vertical shaft 37, the latter carrying on its upper end a circular disk 38 engaging a corresponding disk 39 secured to the member 35, the shaft 37 being maintained in the bore 36 by a nut 40 on the upper end of said shaft. The disk 38 carries graduations 41 cooperating with an indication on the disk 39 to indicate the angular adjustment of the shaft 37 relative to the member 35 and accordingly the angular relation of the cutter 27 to the axis of the tire. The shaft 37 is held in adjusted position by a frictional member 42 secured in an annular recess 43 in the disk 39 and engaging the under side of the disk 38, the latter being recessed at 44 to receive said strip. The weight of the mechanism 26 provides frictional contact between the disk 38 and said strip 42.

A frame work, comprising parallel horizontal rods 45 connected at opposite ends by connecting members 46, see Fig. 4, is secured to the lower end of the shaft 37 by bolts 47 extending through a horizontal member 48 integral with the lower end of the shaft 37. Said member 48 is arcuate in cross-section to receive the upper of said rods 45, and said bolts 47 extend through said member 48 into engagement with said rod.

A carriage 49, on which the cutter 27 is mounted, is arranged for horizontal movement on said rods 45. Referring to Fig. 4, the carriage 49 is provided with spaced pairs of grooved rolls 50; the upper pair of said rolls engages the upper of the rods 45 on the under side thereof and the lower pair of rolls 50 engages the upper side of the lower rod 45. Said rolls 50 are mounted for rotation on bolts 51 extending through the carriage 49, with the rods 45 engaging the grooves in the rolls. In this manner, the carriage is supported for movement on said rods 45, said movement being limited by adjustable members 52 carried on a bar 53 extending between and secured to the connecting members 46. The members 52 are adjustable along the bar 53 and are locked in adjusted position by set screws 54 which engage said bar 53. Thumb screws 55 in the members 52 are adjustable therein, and the ends of said thumb screws engage rubber tips 56 on a lug 57 on the carriage 49, said tips 56 acting as resilient bumpers for the carriage 49 during the movement of said carriage on the rods 45, said members 52 with the thumb screws therein constituting adjustable stops for said carriage.

The carriage 49 has a depending portion 58 provided with a vertical recess 59 for the reception of a member 60 vertically movable within said recess, said depending portion having a set screw 61 for locking said member 60 in position. The lower end of the member 60 provides a hub 62 to receive a housing 63, the latter providing a bearing for the rotary cutter shaft 64. The shaft 64 carries the cutter 27 on the right hand end thereof, said cutter being secured in position by a nut 65 which engages the threaded end of the shaft 64, thereby permitting replacement of the cutter when desired. A shield 66, which is carried by brackets 67 secured to the hub 61, extends over the upper half of the cutter to shield the operator from dust during the operation of the machine.

The cutter 27 is prevented from cutting too deeply into the periphery of the tire by a gage member 68 adjustable on the member 60. Said gage member 68 comprises an outer ball bearing race 70 which is engageable with the surface of the tire to be cut and an inner race 71 supported in proper adjusted position by a thumb screw 72 extending through a slot 73 in the member 60 and threadedly engaging a bracket 74 forming an integral extension of the inner race 71. The outer race 70 is rotatably supported on the inner race 71 by a series of balls 75 and thus, as the cutter and gage are brought into engagement with the surface of a tire to be grooved, said outer race 70 may rotate as the cutter is moved relative to the tire but is maintained in desired relation by the inner race 71.

The drive for the cutter 27 is from an electric motor 76 secured to an upwardly projecting portion 77 of the carriage 49, said motor being mounted with the projecting end of the drive shaft 78 depending vertically. A connecting member 79 is secured to the end of said shaft 78 and the lower end of said member 79 is provided with a vertical recess 80 for the reception of a shaft 81. The latter is vertically slidable within said recess 80 but is held against rotation relative to the member 79 by a key 82 which engages a key-way, not shown, formed in said member 79. The lower end of the shaft 81 is connected by a universal joint 83 to a vertical shaft 84 journaled in the housing 63, said shaft 84 carrying on the lower end thereof a bevel gear 85 located within the housing. The gear 85 is arranged to engage a bevel gear 86 secured to the left hand end of the cutter shaft 63, thereby procuring rotation of the cutter 27 in response to rotation of the motor 76. The housing 63 carries a handle 87 by which the cutter 27 is moved into and out of engagement with the tire to be cut. The vertical sliding movement of the shaft 81 in the member 79 and the vertical sliding movement of the member 60 in the vertical recess 59 permit vertical movement of the cutter 27 relative to the carriage during the passage of the cutter over the surface of the tire, to compensate for the curvature of said tire or for inequalities in the surface thereof. Said cutter is maintained in proper relation to the tire by the carriage since the member 60 is rectangular in cross section and engages the rectangular recess 59, the latter having a cover plate 88 to support said member 60 against turning movement within said recess.

The cutter 27 by which the tire is grooved has a construction which cuts the tire material rapidly without burning said tire and at the same time leaves a smooth surface. Referring to Fig. 6, the cutter comprises a disk of abrasive material, said disk having an opening 89 in the center thereof for mounting said cutter on the shaft 64. The periphery 90 of the cutter is provided with spaced notches 91 defining cutting teeth 92 between said notches. Each of said teeth 92 has a forward cutting face 93 which is approximately radial, said face being preferably cut back slightly from the true radial direction for a better cutting action, and the outer surface 94 of the tooth, comprising a portion of the periphery 90, is arcuate and concentric to the axis of the cutter 27, thereby providing for an abrading action on the material being cut. The cutting face 93 of each tooth is cut back on a cutting plane which is angularly related to the axis of the cutter to define a forward cutting edge 95 which is coextensive with the plane defined by one side of said disk. The planes defined by successive teeth are angularly related to each other so that the forward cutting edges of successive teeth are coextensive with opposite sides of said disk, thereby providing an action similar to the action of a saw-blade as said cutter rotates. It will be noted that the cutter in operation first gouges out a portion of the material being cut by the action of the cutting edge 95 and face 93, and then an abrading action takes place on said material as the outer surface 94 of each tooth passes over the material. Between successive cutting and abrading operations, the material being cut is allowed to cool by reason of the notches formed in the wheel, said notches functioning as fans to carry air over the cut surface. Such operations obviously take effect in very rapid succession during the rotation of the cutter, thereby providing the desired cutting action above noted without injury to the material being cut.

In the operation of the machine, the tire 11 is mounted on the chuck 7 in the position shown. In cutting circumferential grooves in the tire, the members 52 are adjusted to prevent movement of the carriage 49 on the rods 45 and the cutter 27 is adjusted into the plane of the tire by rotation of the shaft 37 and the mechanism secured thereto within the member 35. The location of the groove to be cut in the tire is then determined by adjustment of the shaft 25 through the coupling 23 by turning movement of the pinion 29 by the crank 30'. The cutter having been properly located, the gage member 68 is set to determine the depth to which the grooves will be cut. After the adjustments are completed the screw 61, which supports the member 60 in inoperative position, is loosened, and the cutter is brought into cutting relation to the tire by downward pressure on the handle 87. The tire is then rotated manually for cutting the circumferential groove, the plunger 13 being locked in inoperative position by the set screw 19.

In cutting transverse grooves across the surface of the tire, the cutter is rotated to the desired angular position by rotation of the shaft 37 in the member 35, the frictional member 42 retaining the mechanism 26 in the desired angular position which is indicated by the graduations 41 on the disk 38, and the stop members 52 are spaced apart a distance corresponding to the length of the groove to be cut. The gage member 68 now being adjusted for the desired depth of cut, the cutter is brought into cutting relation to the tire by downward pressure on the handle 87 and is moved transversely across the tire by movement of the carriage along the rods 45. The cutter is free to move vertically by sliding movement of the member 60 in the recess 59 and also by sliding movement of the shaft 80 in the member 78, so that the cutter remains in engagement with the tire during the movement of the carriage to carry said cutter over the tire. During the cutting of transverse grooves, the tire is held against rotation by engagement of the plunger 13 with the indexing plate 12. After one transverse groove has been cut, the tire is indexed through the desired angle by the indexing plate and plunger and a second groove is cut. It will be noted that the stop members 52 permit the length of the groove to be accurately determined and the indexing plate permits accurate angular movement of the tire between successive grooves so that the grooves will all be uniformly spaced apart.

It will be noted that the machine thus supports the cutter in desired relation to the tire for cutting grooves in the tread thereof in any angular relation to the plane of the tire, and that the length of the groove cut is accurately determined by the members 52. The cutter, the axis of which is always in a plane parallel to the axis of the tire is universally adjustable in that plane to position the cutter in the desired relation to the tire surface.

We claim,

1. In a device of the character described, a base, an index chuck on said base for supporting a tire, horizontal guideways, means for supporting said guideways on said base and providing for vertical and horizontal adjustment of said guideways relative to the chuck, a carriage movable on said guideways, a cutter, and means for supporting said cutter on said carriage for movement therewith as the latter is moved on the guideways.

2. In a device of the class described, a base, a rotary support on said base for supporting a tire, horizontal guideways, means for supporting said guideways on said base and providing for vertical and horizontal adjustment of said guideways relative to the rotary support, a carriage movable on said guideways, a cutter, means for supporting said cutter on said carriage for movement therewith as the latter is moved on the guideways, and means providing for vertical sliding movement of said cutter on said carriage.

3. In a device of the class described, a base, a rotary support on said base for supporting a tire, horizontal guideways, means for supporting said guideways on said base and providing for vertical and horizontal adjustment of said guideways relative to said support, a carriage movable on said guideways, a cutter, and means for supporting said cutter on said carriage for movement therewith as the latter is moved on the guideways, said cutter being vertically slidable on said carriage, and gage means adjustable relative to the periphery of the cutter to limit the depth of the cut made by said cutter.

4. In a device of the class described, a base, a rotary support on said base for supporting a tire, horizontal guideways, means for supporting said guideways on said base and providing for horizontal adjustment of said guideways relative to the support, a carriage movable on said guideways, a cutter, means for supporting said cutter on said carriage for movement therewith as the latter is moved on the guideways, and means providing for vertical sliding movement of said cutter on said carriage.

5. In a device of the class described, a base, a rotary support on said base for supporting a tire, horizontal guideways, means on said base for supporting said guideways and providing for vertical and horizontal adjustments of said guideways relative to said support, said guideways being mounted for angular adjustment about a vertical axis, a carriage movable on said guideways, a cutter, and means for supporting said cutter on said carriage for movement therewith as the latter is moved on the guideways.

6. In a device of the class described, a base, a rotary support on said base for supporting a tire, horizontal guideways, means on said base for supporting said guideways and providing for vertical and horizontal adjustments of said guideways relative to said support, said guideways being mounted for angular adjustment about an axis perpendicular to the axis of the rotary support, means for securing said guideways in adjusted position, a carriage movable on said guideways, a cutter, and means for supporting said cutter on said carriage for movement therewith as the latter is moved on the guideways.

7. In a device of the class described, a base, a rotary support for a tire, guideways, means for supporting said guideways on said base and providing for vertical and horizontal adjustment of said guideways relative to said support, a carriage movable on said guideways in a plane parallel to the axis of said rotary support, a cutter, and means for supporting said cutter on said carriage with the axis thereof in a plane substantially parallel to a plane defined by the axis of said rotary support, said cutter being movable with said carriage as the latter is moved on the guideways, and said cutter being movable relative to said carriage perpendicularly to the line of movement of said carriage.

8. In a machine for grooving the tread surface of tires, a base, a chuck on said base for supporting a tire, a cutter, a holder for said cutter, means for supporting said holder on said base and providing for vertical and horizontal adjustment of said holder relative to the chuck, said holder supporting said cutter in a position to engage the tread of the tire, and means to provide for angular adjustment of the cutter about a vertical axis, said cutter being vertically slidable to accommodate said cutter to inequalities in the tread surface in the tire.

9. In a machine for grooving the tread surface of tires, a base, a chuck on said base for supporting a tire, a cutter, a carriage for said cutter, horizontal guideways on which said carriage is movable, means for supporting said guideways on said base and providing for vertical adjustment of said guideways relative to the chuck and for angular adjustment of said guideways about a vertical axis, and means to provide for a vertical sliding movement of said cutter independently of the vertical adjustment to accommodate said cutter to inequalities in the tire.

10. In a device of the character described, a base, means for rotatably supporting a tire on said base, a transverse guide, means for supporting said guide on said base and providing for vertical and horizontal adjustment of said guide, a carriage movable on said guide, a cutter, and means for supporting said cutter on said carriage for movement therewith as the latter is moved on the guide.

RALPH N. PENDLETON.
ROLAND H. HODGE.